Aug. 23, 1966   R. W. KING   3,268,641
METHOD OF AND APPARATUS FOR MAKING PLASTIC CONTAINERS
Filed March 12, 1963   2 Sheets-Sheet 2

INVENTOR.
ROBERT W. KING
BY W. A. Schavich
Spence L. Blaylock
ATTORNEYS

United States Patent Office 3,268,641
Patented August 23, 1966

3,268,641
METHOD OF AND APPARATUS FOR MAKING
PLASTIC CONTAINERS
Robert W. King, Toledo, Ohio, assignor to Owens-
Illinois Glass Company, a corporation of Ohio
Filed Mar. 12, 1963, Ser. No. 264,647
8 Claims. (Cl. 264—97)

The present invention relates to a method of and apparatus for making plastic containers or the like by a combined injection molding, extruding and blow molding technique. More particularly, the present invention relates to the manufacture of plastic containers or the like by the utilization of a two-part injection mold core for preventing the occurrence of interior flash in the container neck.

In the manufacture of plastic articles, such as containers, by utilization of a technique such as that disclosed in the patent to R. C. Allen et al. No. 3,008,192, assigned to the assignee of the present invention, a plurality of articles are made simultaneously at multiple orifice locations. Generally, the method and apparatus includes mechanism for positioning a plurality of neck molds at the orifices, injection molding a container neck in each of the neck molds, retracting the neck molds simultaneously from the orifices while extruding tubes joined to the injection molded necks, respectively, simultaneously closing blow molds on the extruded tubes, and then introducing air or other blowing medium under pressure through the neck molds and into the interior of the mold-enclosed tubes to inflate the tubes to their final configurations. To perform the functions of the neck mold, i.e. defining the hollow container neck and accommodating the flow of blow air into the mold-enclosed tubes, the neck molds are provided with interior core pins which project through the laterally separable neck mold sections to abut an extrusion mandrel forming the interior of the annular orifices through which plastic is expressed for both injection molding and extrusion.

In a multiple orifice mechanism such as that above described and utilizing a plurality of neck molds in order that a plurality of bottles can be made simultaneously, the individual neck mold cores must be painstakingly adjusted, so as to snugly and exactly abut the ends of the mandrels at the orifice to prevent the occurrence of internal "flash" due to leakage of material from the orifice between the core pins and the orifice mandrels. This adjustment at each of the orifice locations must be made each time any change is made in the equipment to accommodate various sizes and types of bottles and further each time that a material of different viscosity or differing flow characteristic is utilized. It is obvious that the necessary adjustments pose a time-consuming and costly problem in the commercial utilization of equipment such as that disclosed in said Patent 3,008,192.

The present invention proposes a modification of the basic method and apparatus of said patent, so as to prevent the formation of deleterious internal flash, while eliminating the necessity for the accurate and painstaking adjustment of each of the individual neck mold cores.

The specific improvement of the present invention involves the replacement of the conventional tubular neck mold core of Patent 3,008,192 with a composite structure including a core sleeve of reduced length and a relatively movable valve element which is interposed between the core sleeve and the orifice during injection molding. Thus, any leakage of plastic material tending to cause internal flash will occur between the valve element and the orifice mandrel.

The valve element also serves to control the flow of blow air through the core sleeve and into the interior of the extruded tube, the valve normally being retained in abutment with the end of the core sleeve to prevent the flow of blow air.

During extrusion of the tube, the valve remains in its closed position and in abutment with the core sleeve. Prior to the admission of blow air into the extruded sleeve, following closure of the blow mold, it is necessary to actuate the valve element in order to accommodate the flow of blow air into the tube. Such actuation is accomplished by fluid pressure actuated means, preferably an air-actuated valve piston joined to the valve element by means of a valve stem projecting axially through the core sleeve. This power actuation of the valve element will displace any plastic material in contact therewith and resulting from leakage during the injection molding operation against the tube to be fused into the still-hot tube.

Thus, the valve element performs the dual functions of controlling the flow of blow air through the neck mold core and also of removing any possible, deleterious flash from the injection molded neck. Since any possible flash is thus removed and integrated into the tube, the precise mold-to-mandrel adjustment is rendered non-critical and is no longer necessary.

It is, therefore, an important object of the present invention to provide a new and improved method of and apparatus for the removal of deleterious internal flash in a container having an injection molded neck.

Another important object of the present invention is to provide an improved method of and apparatus for making a container or the like by a combined injection molding, extrusion and blow molding technique and wherein any deleterious internal flash formed during injection molding is removed prior to blow molding of the final container.

A further important object of the present invention is the provision of a method of making a blow molded object having an injection molded portion formed at an injection orifice at which a mold core abuts an orifice mandrel and including the steps of providing a relatively movable mold core element actually contacting the orifice mandrel during injection, and moving the relatively movable core element prior to blow molding to remove any flash resulting from leakage of plastic material during the injection molding operation.

Yet another, and no less important, object of the present invention is the provision of an apparatus for performing sequential injection molding, extrusion and blow molding operations and including an injection mold core abuttable with an orifice mandrel during injection molding, the core being subdivided into relatively movable core elements abuttable during injection molding, means for moving the injection mold from the orifice during extrusion with the core elements in abutment, and means for relatively moving the core element prior to blow molding to remove any internal flash formed during injection molding.

Other objects of this invention will appear in the following description and appended claims, reference being had to the accompanying drawings forming a part of this specification wherein like reference characters designate corresponding parts in the several views.

URE 1 and illustrating the apparatus during a blow molding operation; and

Figures 2, 3:
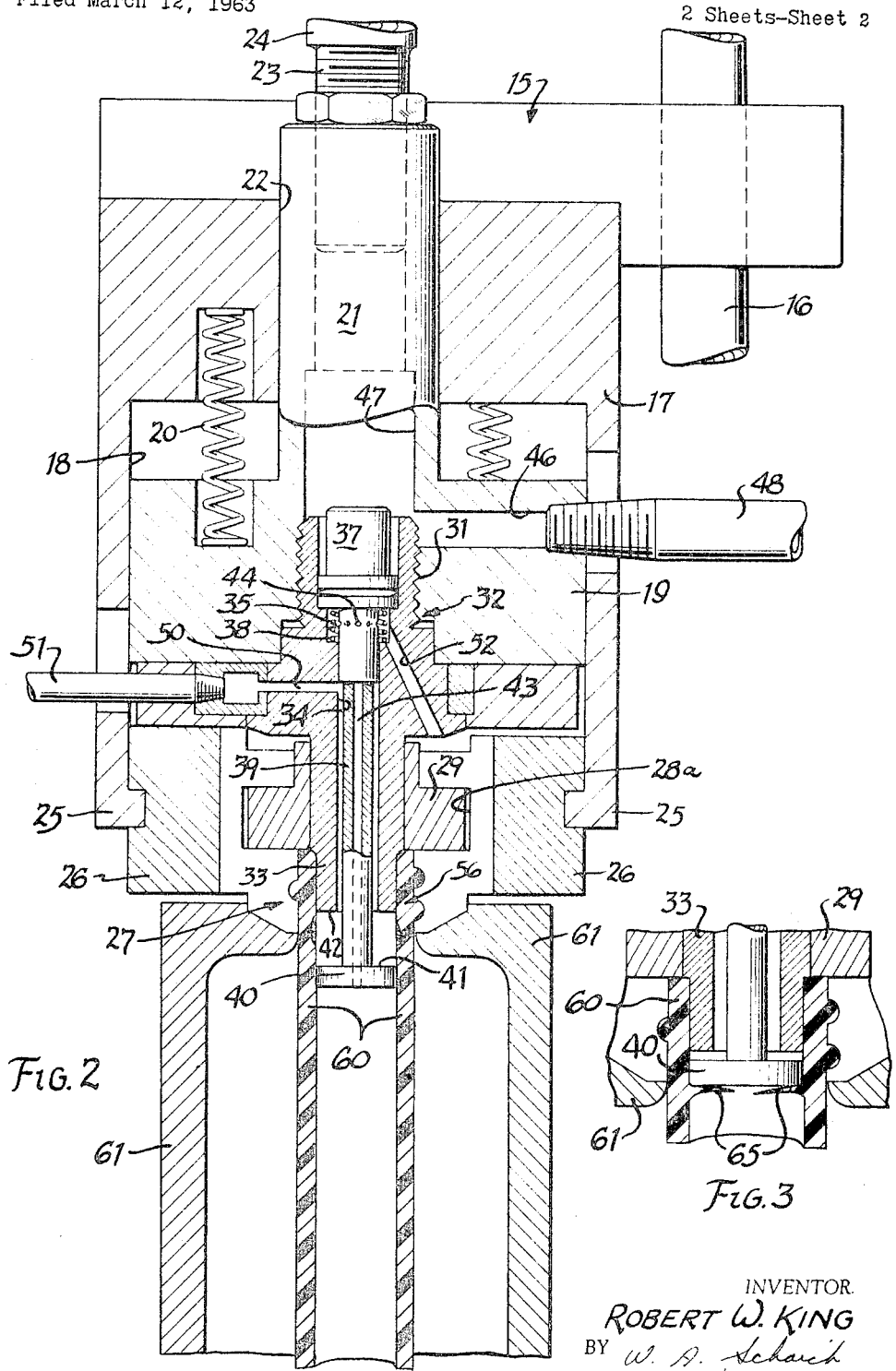
FIGURE 2 is a vertical sectional view similar to FIG-

FIGURE 3 is a fragmentary sectional view illustrating the apparatus in a transitory position subsequent to injection molding and prior to blow molding.

Before explaining the present invention in detail, it is to be understood that the invention is not limited in its applicaton to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
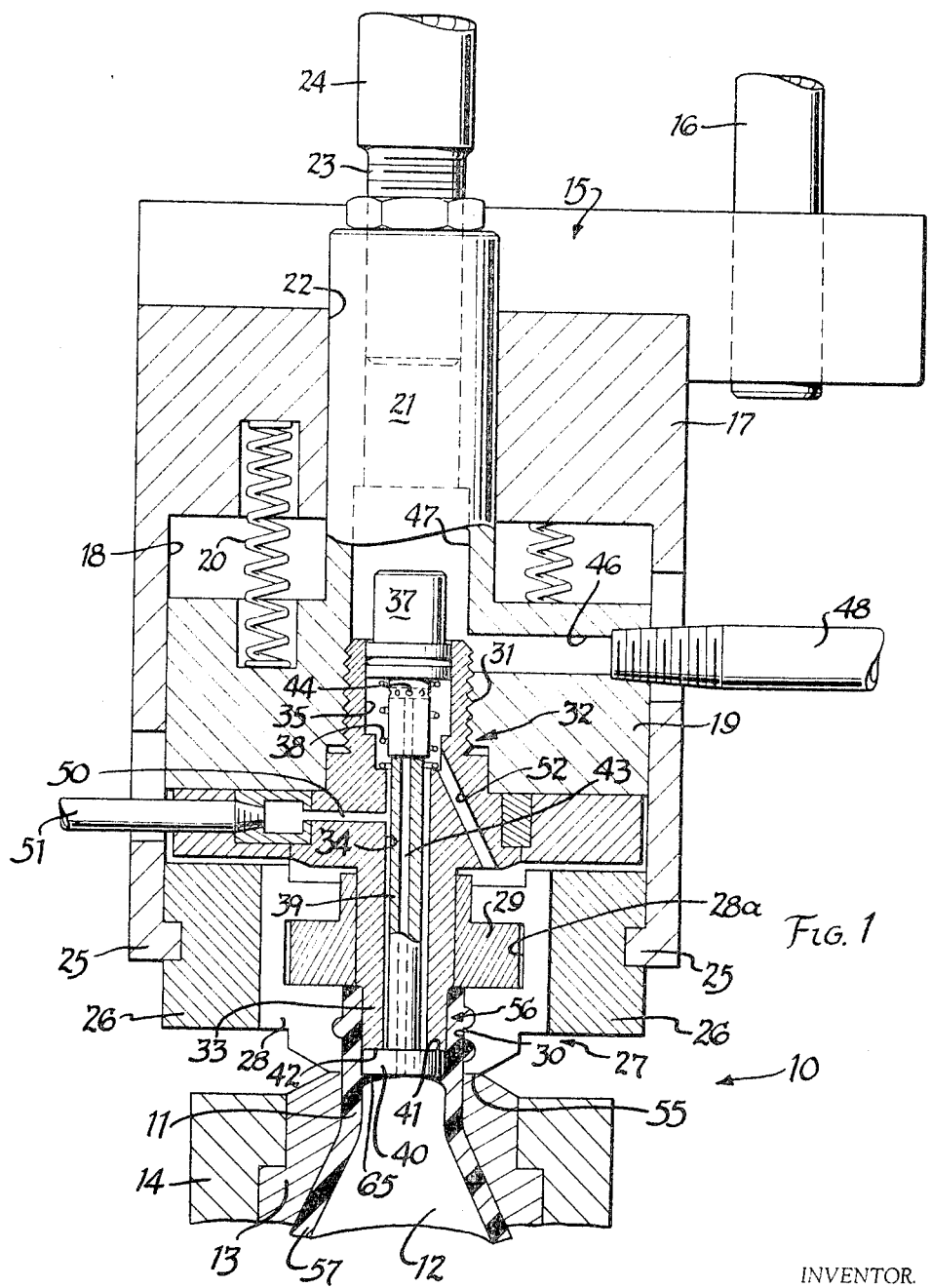
FIGURE 1 is a vertical sectional view of an apparatus of the present invention capable of carrying out the method of the present invention and positioned to perform an injection molding operation.

As shown on the drawings:

In FIGURE 1, reference numeral 10 refers generally to a plastic forming machine of the type illustrated and described in detail in the above-identified Patent No. 3,008,192, assigned to the assignee of the present invention. It will be appreciated that the machine 10 includes a plurality of extrusion orifices 11 (only one such orifice being illustrated for clarity of description), the orifices 11 each being defined between a central orifice mandrel 12 and a surrounding annular orifice nozzle 13 secured to an orifice block (not shown) by an apertured orifice plate 14.

Superimposed over the orifice plate 14 and movable vertically relative thereto is a neck mold carrier 15 vertically movable on guide rods 16 and including a head block 17 having a downwardly opening bottom recess 18 within which is slidably positioned a neck mold stripper block 19. Springs 20 are interposed between the head 17 and the stripper block 19 to urge the stripper block to an illustrated lower position.

The stripper block 19 is provided with an upwardly projecting cylindrical embossment 21 projecting through a corresponding aperture 22 formed in the head 17 and secured at its upper end, as by internal threads (not shown), to the threaded end 23 of an actuating cylinder rod 24.

The head 17 is provided at its lower extremity with longitudinal guide projections 25 slidably supporting mounting blocks 26 to which are secured for joint movement therewith a pair of separable neck mold sections 27. These neck mold sections 27 normally abut one another at confronting faces 28, the neck mold sections 27 being generally semi-cylindrical in configuration and each having a semi-annular recess 28 therein receiving a neck mold insert 29 upon which the neck mold sections 27 remain guided even when laterally separated.

The lower extremities of the neck mold sections are contoured, as at 30, to define the exterior periphery of an injection molded portion of the plastic article, such as the neck of a container or the like.

Carried by the element 19 and threadedly retained within a threaded recess 31 therein is a neck mold core 32 having a lower sleeve portion 33 depending into the contoured, generally cylindrical mold recess 30 defined by the neck mold sections 27. The neck mold core 32 is provided with a central, axially extending bore 34 opening onto an upper enlarged recess 35 communicating with the interior of the embodiment 21 by which the block 19 is connected to the piston rod 24.

Positioned in the bore 35 is an actuating piston 37 normally urged to an upper position (illustrated in FIGURE 1) by means of a compression spring 38 interposed between the piston 37 and the bottom of the recess 35. Formed integrally with the piston is a depending actuating stem 39 terminating in a radially enlarged head or valve element 40 having an exterior diameter substantially the same as the exterior diameter of the sleeve 33 and normally having its upper face 41 urged into abutment with the lower extremity 42 of the sleeve 33 by the spring 38.

The stem 37 is provided with a bore 43 opening at its lower end onto the lower face of the valve head 40 and communicating at its upper end with transverse apertures 44 opening onto the recess 35. The block 19 is provided with a transverse passage 46 establishing communication between the internal recess 47 of the abutment 21 and a fluid pressure supply conduit 48 communicating with a suitable source of fluid, such as air, under pressure.

The block 49 also communicates through a lateral passage 50 with a second source of fluid under pressure, as through conduit 51, while the recess 35 is vented to the atmosphere through an exhaust passage 52.

*Operation*

The apparatus as above described is utilized in a manner which will be readily appreciated by a comparison of FIGURES 1, 2 and 3. Generally, this operation includes the initial positioning of the assembly 10 as illustrated in FIGURE 1. Thus, the lower extremities 55 of the neck mold sections 27 abut the upper surface of the orifice nozzle 13, the orifice communicating with the injection mold space 56 defined intermediate the contoured surfaces 30 of the neck mold sections and the exterior peripheries of the sleeve 33 and the valve element 40. Plasticized plastic material 57 supplied to the orifice 11 under pressure thus fills the mold space 56.

Nominally, the undersurface of the valve head 40 abuts the upper extremity of the mandrel 12 to form a pressure-tight connection therebetween. As a practical matter, however, in a multi-orifice machine, it may well be that the undersurfaces of one or more of the valve head 40 are spaced from the upper extremity of the mandrel and that some plasticized material will flow therebetween to provide a skin or thin layer 65 of plasticized material intermediate the associated mandrel extremities and the heads 40. If this skin or "flash" were to remain in position following complete formation of the bottle, filling of the final container would be interfered with and an unusable or "scrap" container would result.

Following the injection molding and the lapse of sufficient time to at least partially solidify the material within the mold space 56, the piston rod 42 is actuated to elevate the carrier 15 on the guide elements 16, thereby moving the mold space 56 from its position at the orifice 11 and accommodating the extrusion of a tube 60 of plasticized material through the orifice, the tube being joined, at its upper end, to material filling the mold space 56. After a tube of the desired length has been extruded, blow mold halves 61 are closed on the extruded tube 60 and the tube is blown to the final configuration of the article.

As illustrated in FIGURES 2 and 3 of the drawings, blow air is introduced through the conduit 51 and the passage 50 for flow through the bore 34 of the neck mold core 32. To accommodate the flow of blow air, the valve 40 must be actuated to its opened position of FIGURES 2 and 3, and this is accomplished by the introduction of fluid under pressure through the conduit 48 and the passage 46 into the space 47 to displace the piston 37 downwardly against the compression force of the spring 38. The downward displacement of the valve head 40 will accomplish two results. First of all, the flash 65 underlying the head 40 will be ruptured and displaced laterally outwardly against the interior walls of the tube 60 (as shown in FIGURE 3). Additionally, the movement of the valve head from its abutment with the end of the core sleeve portion 33 will open the passage 34 to accommodate the flow of blow air from the conduit 51 into the interior of the tube 60. The flash 65 forced outwardly against the tube inner periphery will be forced against and come into intimate heat exchange relation with the inner periphery of the tube so that the flash will re-melt due to the residual heat within the massive tube wall, the flash thus becoming integrated into the tube and disappearing for all practical purposes.

Thus, it will be appreciated that the present invention provides a new and novel method of and apparatus for forming a blown article having an injection molded portion and in which the presence of deleterious interior flash, due to faulty mold-orifice orientation, is eliminated or removed by utilization of the two-part mold core. The element 40 which is effective to remove the flash also serves to valve blow air into the tube when the valve element is actuated by its power means (the piston 37). It has been found that shorter mold close times will result when the blow air from the conduit 51 is circulated through the blown tube 60 and air is continuously exhausted from the interior of the tube. Such an exhaust is provided by the axial passage 43 through the valve stem 39, the passage communicating with the lower terminal face of the valve element 40 so that air from the tube can flow upwardly through the axial passage 43, radially outwardly through the ports 44 into the recess 35 and hence through the exhaust passage 52 to be dissipated to the atmosphere.

After completion of the blow molding cycle, the blow mold sections 61 are opened, the stripper block 19 is elevated and the neck mold sections 27 are opened to release the article in accordance with the teachings of the above-identified Patent No. 3,008,192. Of course, prior to opening of the blow mold sections, the introduction of air through the passage 51 is interrupted, the introduction of actuating air through the conduit 48 is interrupted, and the spring 38 returns the piston 37 to its position of FIGURE 1 so that the valve head 40 again abuts the end face 42 of the core sleeve 33. The apparatus is thus conditioned for the next subsequent operating cycle.

Having thus described my invention, I claim:

1. In a method of making a plastic article by a combined injection molding and blow molding operation, the steps of positioning an interior core provided with a terminal axially movable valve element between laterally movable peripheral injection mold sections, abutting the valve element with the mandrel of an orifice, filling the mold space defined between the core and the mold sections with plasticized material from said orifice, any flash being formed between said element and said mandrel, moving the core and the mold sections from the orifice while extruding a tube integral with material filling the mold space, enclosing the tube in a blow mold, displacing said element relative to said core sleeve to displace any flash formed during filling of the mold against the inner periphery of said tube, and blowing the tube interiorly of the blow mold.

2. In a combined injection molding, extrusion and blow molding apparatus for the manufacture from plasticized material of blown containers having injection molded necks, said apparatus including a pair of separable neck rings defining the outer surface of the container neck and initially positioned at an orifice to receive plasticized material under pressure therefrom and being subsequently movable from the orifice to accommodate the extrusion from the orifice of a tube integral with material constituting the neck, the improvements comprising a tubular core sleeve insertable axially through the separable neck rings to define the major portion of the inner periphery of the injection molded neck of the container, a valve stem projecting axially through said core sleeve and defining with the core sleeve an intermediate air passage, a radially enlarged valve head at the terminal end of said valve stem normally abutting the end of said core sleeve to block said air passage and to define the remainder of said inner periphery of the neck, said valve head abutting the orifice mandrel during injection molding of the neck, and fluid pressure actuated means for reciprocating said valve stem to move said valve head relative to said core sleeve to accommodate the flow of blow air into the extruded sleeve and simultaneously to deflect against the tube any plastic material adherent to said valve head during the injection molding of the container neck.

3. In a combined injection molding, extrusion and blow molding apparatus for making a blown plastic container having a container neck which is injection molded in a neck fold initially positioned at an extrusion orifice with a neck core aligned with and spaced from an orifice mandrel and means for moving the neck mold from the orifice as a blowable tube is extruded, the improvements of a movable core element interposed between and contacting the injection mold core and the orifice mandrel during injection molding, and means for moving the core element relative to the remainder of the core and into the extruded tube subsequent to the injection molding step to displace radially outwardly into the tube any flash formed during injection molding.

4. In a method of making a plastic article by a combined injection molding, extruding and blow molding operation wherein an injection molded portion of the article is formed integrally with an extruded tube which is subsequently blown to the shape of the article and wherein an injection mold space is defined between outer transversely separable neck mold sections and an interior tubular core sleeve provided with an axially movable valve element having a closed position abutting the end wall of the core sleeve and an open position spaced from the end wall, the steps of filling said mold space with plasticized material issued from an orifice having a mandrel abutting the valve element, any interior flash being formed intermediate said mandrel and said valve element, moving the mold space from the orifice while extruding a tube integral with material filling the neck mold space, enclosing the tube in a blow mold, and displacing said valve element to its open position to simultaneously (1) displace any interior flash against the inner periphery of said tube and (2) accommodate the passage of blow air through said core sleeve and into said tube.

5. In an apparatus for making a plastic article including an injection mold having a mold core aligned with an extrusion orifice mandrel, the improvements of a movable core element interposed between said injection mold core and the orifice mandrel during injection molding and movable relative to the core subsequent to the injection molding step to displace any flash formed during molding radially outwardly for integration into the plastic article.

6. In a method of making a blow article having an injection molded portion by positioning an injection mold at an annular extrusion orifice, filling the mold from the orifice, and displacing the mold from the orifice to extrude a tube which is subsequently blown to shape, the steps of abutting the orifice with an element located interiorly of the injection mold during filling of the mold so that any flash at the interior of the tube is formed intermediate said element and said orifice, and, following extrusion of the tube and prior to blowing of the tube, displacing said element relative to said mold into the interior of said tube to force any such flash against the inner periphery of the tube for integration into the tube.

7. In an apparatus for making a plastic article, said apparatus including an injection mold positioned at an extrusion orifice mandrel and having a core in contact with the orifice, the improvements of a movable valve element interposed between the injection mold core and the orifice mandrel during injection molding and movable relative to the core subsequent to the injection molding step to displace any flash formed during molding radially outwardly for integration into the plastic article.

8. In a method of making a blow article having an injection molded portion by positioning an annular injection mold at an annular extrusion orifice, said orifice and said mold being defined by concentric inner and outer elements, respectively, filling the mold from the orifice, and displacing the mold from the orifice to extrude a tube which is subsequently blown to shape, the steps of during filling of the mold abutting in face-to-face relation the inner elements of the mold and the orifice, respectively, any interior flash formed during filling occurring between said elements, and following extrusion of the tube and prior to blowing of the tube, displacing the inner mold element relative to the remainder of said mold and into the interior of said tube to force any such flash against the inner periphery of the tube.

References Cited by the Examiner
UNITED STATES PATENTS 2,706,308   4/1955   Lorenz _____ 264—97

ROBERT F. WHITE, *Primary Examiner.*
A. R. NOE, *Assistant Examiner.*